United States Patent
Mackenzie et al.

(10) Patent No.: US 8,186,746 B2
(45) Date of Patent: May 29, 2012

(54) PASSIVELY DEPLOYABLE AIR DAM FOR A VEHICLE

(75) Inventors: Steven K. Mackenzie, West Bloomfield, MI (US); James L. Luttinen, Brighton, MI (US); Scott P. Charnesky, Birmingham, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 171 days.

(21) Appl. No.: 12/697,526

(22) Filed: Feb. 1, 2010

(65) Prior Publication Data
US 2011/0187151 A1    Aug. 4, 2011

(51) Int. Cl.
*B60J 1/20* (2006.01)
*B62D 35/02* (2006.01)

(52) U.S. Cl. .................................... 296/180.5
(58) Field of Classification Search ..... 296/180.1–180.5
See application file for complete search history.

(56) References Cited

U.S. PATENT DOCUMENTS

| | | | | |
|---|---|---|---|---|
| 3,618,998 A | * | 11/1971 | Swauger | 296/180.5 |
| 4,131,308 A | * | 12/1978 | Holka et al. | 296/180.5 |
| 4,159,140 A | * | 6/1979 | Chabot et al. | 296/180.5 |
| 4,398,764 A | * | 8/1983 | Okuyama | 296/180.1 |
| 4,558,897 A | * | 12/1985 | Okuyama et al. | 296/180.5 |
| 4,585,262 A | * | 4/1986 | Parks | 296/180.1 |
| 4,659,130 A | | 4/1987 | Dimora et al. | |
| 4,904,016 A | * | 2/1990 | Tatsumi et al. | 296/180.5 |
| 4,976,489 A | | 12/1990 | Lovelace | |
| 6,079,769 A | * | 6/2000 | Fannin et al. | 296/180.1 |
| 6,886,883 B2 | * | 5/2005 | Jacquemard et al. | 296/180.5 |

FOREIGN PATENT DOCUMENTS

DE   33 43 410 A1   6/1984
DE   600 04 423 T2   7/2004

* cited by examiner

*Primary Examiner* — H Gutman

(57) ABSTRACT

An air dam assembly mounted under a front end of a vehicle includes a passively deployable air dam assembly. The passively deployable air dam assembly includes a passively deployable air dam having a front surface at least partially exposed to ram air when the vehicle is traveling in a forward direction, and a passive deployment assembly including at least one spring biasing the passively deployable air dam into a retracted position, with the passive deployment assembly engaging the passively deployable air dam to allow the passively deployable air dam to move, against the bias of the spring, from the retracted position to a deployed position closer to ground under the vehicle when a forward speed of the vehicle reaches or exceeds a predetermined activation speed.

8 Claims, 4 Drawing Sheets

PASSIVELY DEPLOYABLE AIR DAM FOR A VEHICLE

BACKGROUND OF INVENTION

The present invention relates generally to air dams for use below the front ends of automotive vehicles.

In order to improve fuel economy at high speeds, some automotive vehicles employ air dams mounted below the front end of the vehicle. The lower ground clearance at the front end created by the air dam improves the aerodynamic drag on the vehicle at high speeds, thus improving fuel economy. These air dams are typically fixed in position. The tradeoff for the positioning of the air dam above the ground (i.e., ground clearance) is between a low height, the lower they are to the ground the better the aerodynamic drag at high speed, and a higher height off the ground, which protects the air dam from being damaged by contact with a curb or parking lot block when parking the vehicle.

To overcome this tradeoff, some have replaced the fixed air dam with a moveable, active air dam that is automatically moved up and down via a motor and linkages controlled by an electronic controller. In this way, the controller can monitor the speed of the vehicle and activate the motor to move the air dam down (lower ground clearance) at higher vehicle speeds and lift it back up when the vehicle slows down. This provides lower ground clearance of the air dam for improved aerodynamic drag at higher vehicle speeds while also providing a higher ground clearance for the air dam when parking the vehicle in order to minimize the chances of damaging the air dam when parking the vehicle.

However, the high cost of the motor, linkages and controller make active air dams too expensive to use on some models of automotive vehicles. Moreover, a potential for warranty cost increases exists due to the fact that a motor, linkage and wiring is packaged low and at the front of the vehicle, potentially exposing it to damage from the environment around the vehicle. These active air dam systems may also add more weight to the vehicle than is desirable.

SUMMARY OF INVENTION

An embodiment contemplates an air dam assembly mounted under a front end of a vehicle comprising a passively deployable air dam assembly. The passively deployable air dam assembly includes a passively deployable air dam having a front surface at least partially exposed to ram air when the vehicle is traveling in a forward direction, and a passive deployment assembly including at least one spring biasing the passively deployable air dam into a retracted position, with the passive deployment assembly engaging the passively deployable air dam to allow the passively deployable air dam to move, against the bias of the spring, from the retracted position to a deployed position closer to ground under the vehicle when a forward speed of the vehicle reaches or exceeds a predetermined activation speed.

An embodiment contemplates a method of deploying a passively deployable air dam from under the front end of a vehicle comprising the steps of: employing a spring to bias the passively deployable air dam upward, away from the ground, into a retracted position; exposing at least a portion of a front surface of the passively deployable air dam to ram air when the vehicle is traveling in a forward direction and the passively deployable air dam is in the retracted position; driving the vehicle at a speed at or above a predetermined activation speed, wherein a ram air pressure on the front surface of the passively deployable air dam at the activation speed will cause the passively deployable air dam to move closer to the ground against the bias of the spring; and, after deployment, driving the vehicle at or below a predetermined retraction speed, wherein the reduced ram air pressure on the front surface of the passively deployable air dam will allow the passively deployable air dam to move further from the ground in response to the bias of the spring.

An advantage of an embodiment is that a passively deployable air dam assembly improves high speed fuel economy without compromising concerns with low speed parking of the vehicle, while also eliminating concerns associated with motors, linkages and controllers that are employed with actively deployed air dams. The deployment of the air dam happens passively using aerodynamic pressures that occur naturally during vehicle operation, yet the deployment of the air dam can be controlled so that it retracts at a lower speed than it deploys, thus reducing the deployment cycling of the air dam. The benefits of an actively deployed air dam are achieved while avoiding the complications of a motor, linkages and a controller, thus reducing costs and warranty concerns. No power supply is needed for actuation.

DETAILED DESCRIPTION

Figure 1:
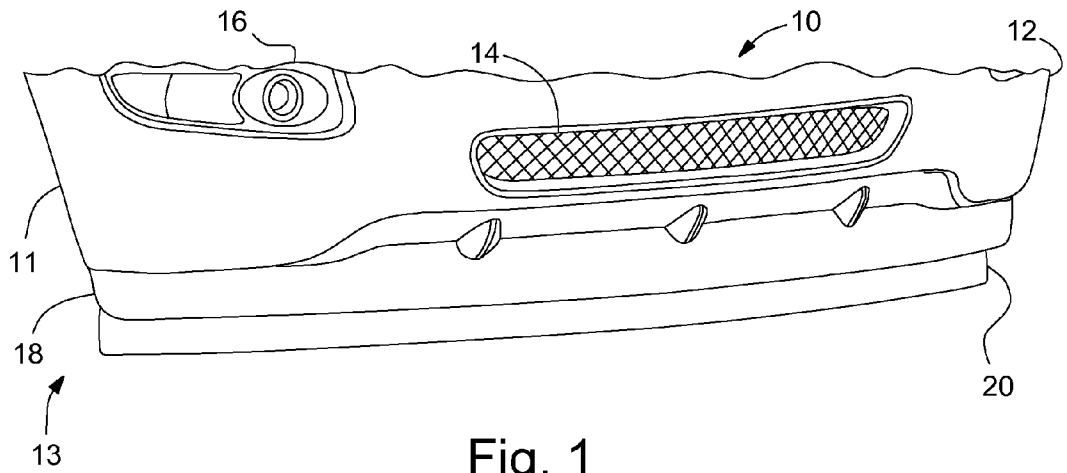
FIG. 1 is a perspective view of a portion of a front end of a vehicle having a passively deployed air dam.

Referring to FIG. 1, a vehicle, indicated generally at 10, is shown. The vehicle 10 includes a front end 11 having a front fascia 12, a grille 14 and headlights 16. Below the fascia 12 is an air dam assembly 13 having a fixed air dam 18, which is not movable relative to the vehicle 10 during vehicle operation. The fixed air dam 18 may be supported by the front fascia 12 or any other suitable vehicle structure near the front end of the vehicle 10. The air dam assembly 13 also includes a passively deployable air dam assembly 20 mounted below and behind the fixed air dam 18. The passively deployable air dam assembly 20 can move relative to the vehicle 10 during vehicle operation.

Figure 2:
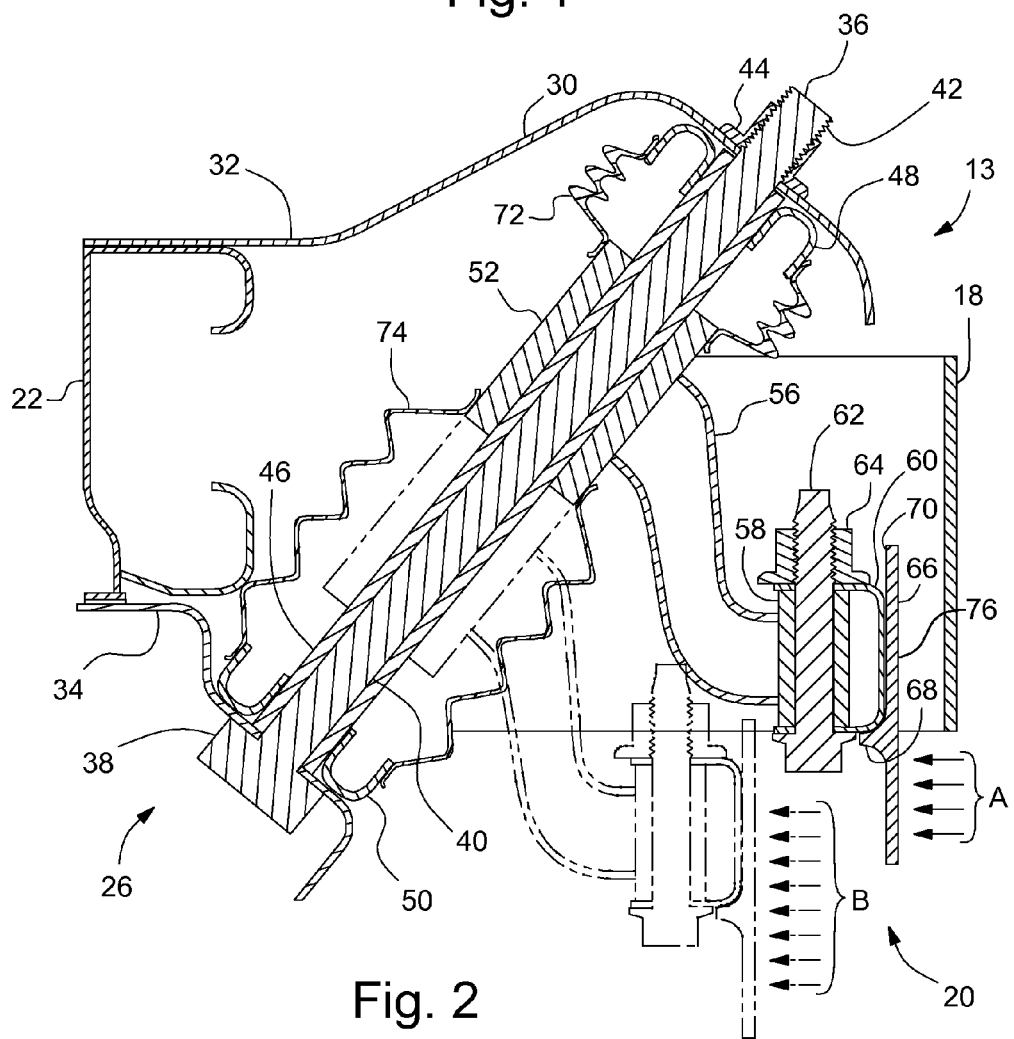
FIG. 2 is a cross section view through a center mount air dam support assembly.
Figure 3:
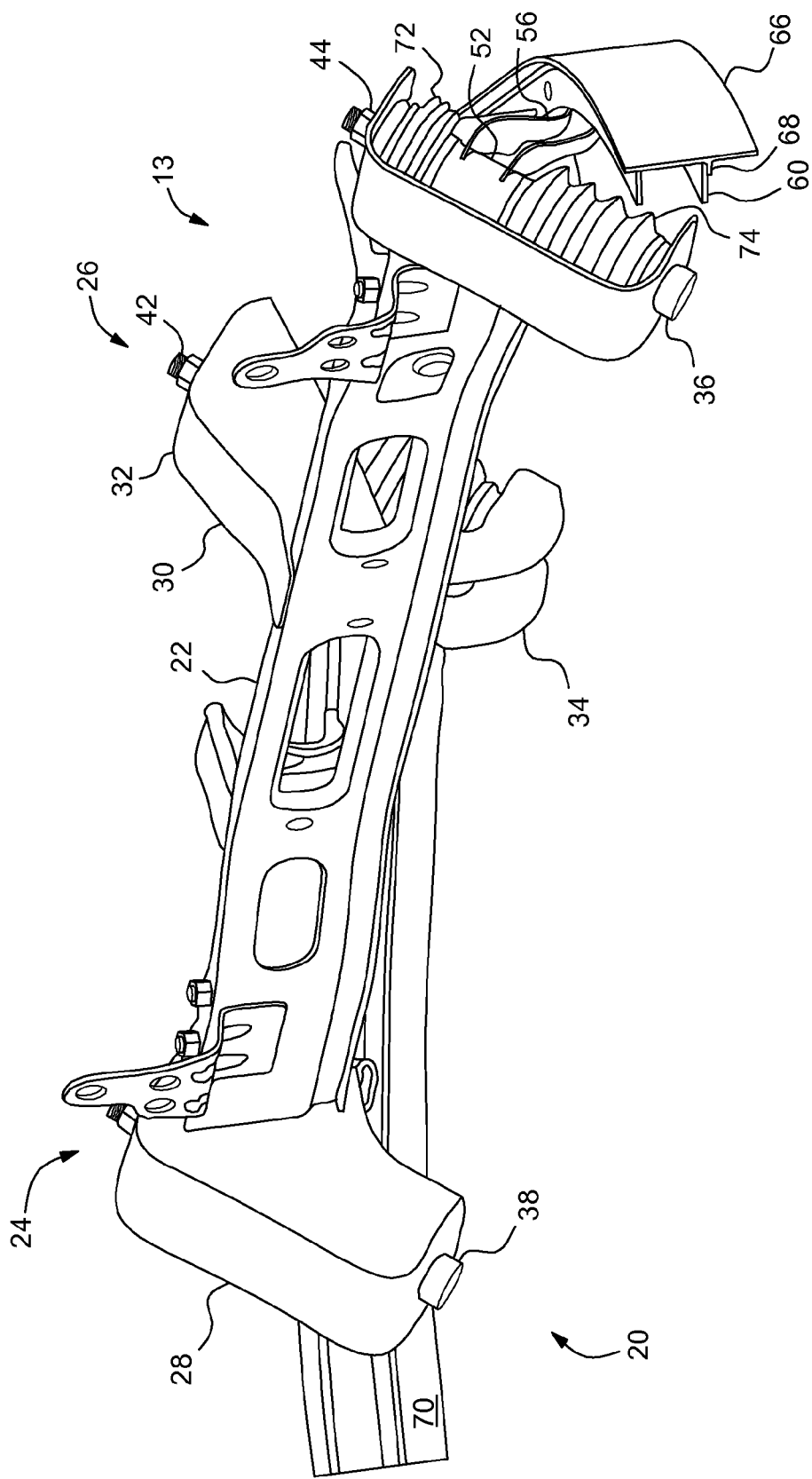
FIG. 3 is a perspective view of a portion of an air dam assembly and some adjacent vehicle support structure.
Figure 4:
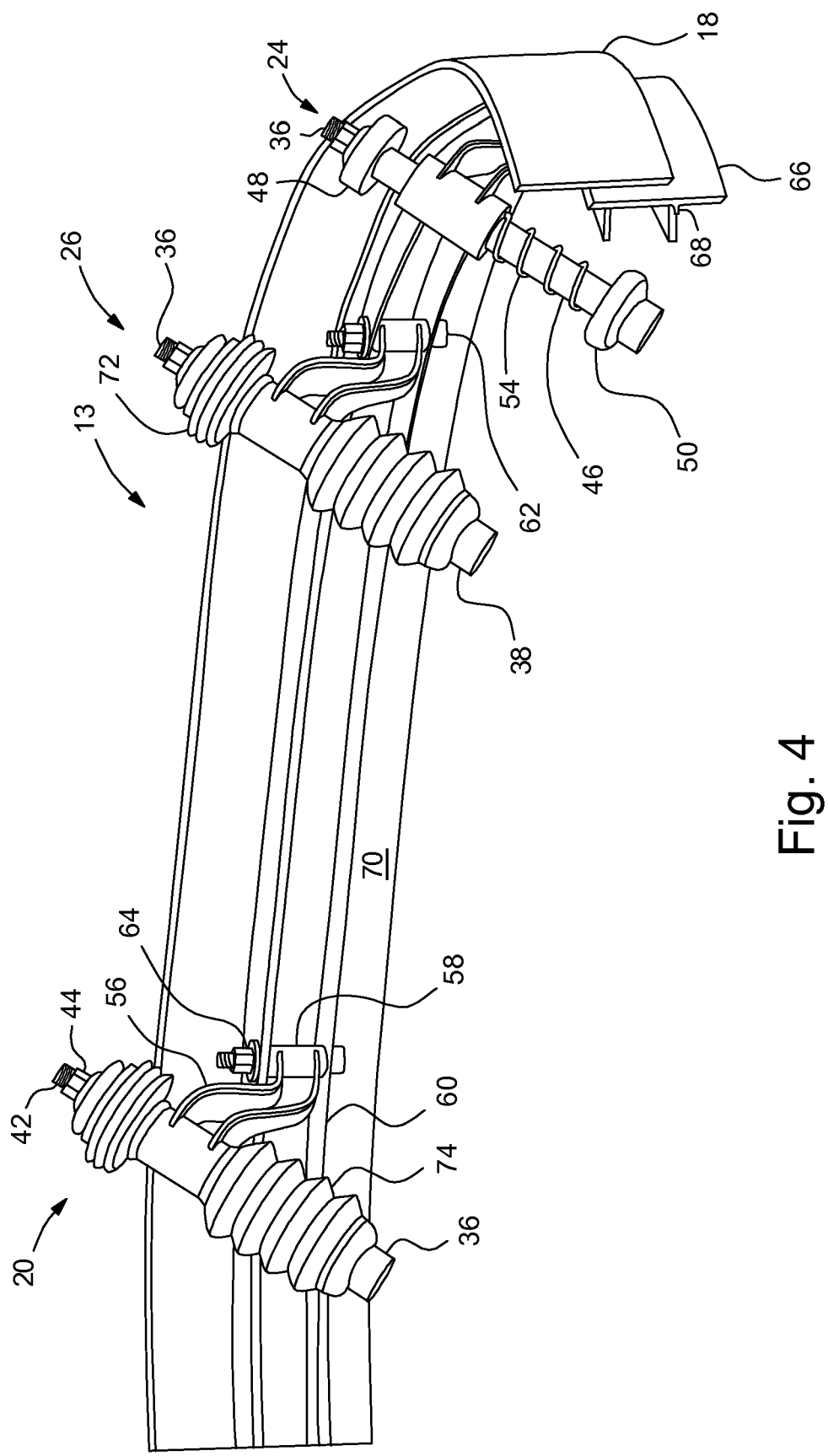
FIG. 4 is a perspective view of the air dam assembly, with a portion of one of the side mount air dam support assemblies removed to show internal working components.

FIGS. 2-4 show various portions of the air dam assembly 13 and portions of the vehicle structure adjacent to the assembly 13. The deployable air dam assembly 20 is supported by vehicle structure near the front of the vehicle—in this embodiment, the support structure is a condenser, radiator and fan module (CRFM) support beam 22 (shown in FIGS. 2 and 3), which is part of the vehicle structure that supports the CRFM (not shown).

The deployable air dam assembly 20 includes a pair of side mount support assemblies 24 (shown in FIGS. 3 and 4) and a center mount support assembly 26 (shown in FIGS. 2-4) mounted between the side mount support assemblies 24. The two side mount support assemblies 24 each include a side housing 28 (shown in FIG. 3) that is secured to the CRFM support beam 22. The center mount support assembly 26 includes a center housing 30 (shown in FIGS. 2 and 3) that includes an upper support frame 32 and a lower support frame 34 that are both secured to the CRFM support beam 22. While three support assemblies 24, 26 are shown, greater or fewer numbers of support assemblies 24, 26 can be employed in the air dam assembly if so desired.

Each of the support assemblies 24, 26 includes a support shaft 36 having a head 38 at a first end that engages with a housing 28 or 30, a long shank portion 40 and threads 42 at a second end that engage with the housing 28 or 30 via a nut 44. The heads 38 and nuts 44 hold the support shafts 36 in place. The shank portions 40 are angled to extend in a forward and upward direction relative to the vehicle 10. Sleeves 46 extend around each of the shank portions 40 to provide for a smooth sliding surface. Also, each of the support assemblies 24, 26 includes an upper travel stop 48 and a lower travel stop 50 at either end of the shank portion 40. Linear slider bearings 52 are mounted around and can slide up and down on each of the sleeves 46 between the upper travel stop 48 and the lower travel stop 50. Alternatively, the sleeves 46 may slide directly on the shank portions 40.

In addition, each of the support assemblies 24, 26 includes a spring 54 that biases the respective linear slider bearings 52 toward the upper travel stop 48. In FIG. 4, one of the side mount support assemblies is shown with boot seals (discussed below) removed in order to reveal an example of a coil spring 54 in compression between the lower travel stop 50 and the linear slider bearing 52, with the spring biasing the slider bearing 52 upward. Such a spring can be used for all of the support assemblies 24, 26, or other types of springs may be employed instead, if so desired. FIG. 2 does not show the spring mounted around the shank portion 40 in order to avoid confusion when showing multiple positions of the linear slider bearing 52.

Each of the support assemblies 24, 26 includes a flexible upper boot seal 72 and a flexible lower boot seal 74. Each of the upper boot seals 72 has a first end that mounts to the upper travel stop 48 and a second end that mounts to an upper end of the linear slider bearing 52. Each of the lower boot seals 74 has a first end that mounts to the lower travel stop 50 and a second end that mounts to a lower end of the linear slider bearing 52. The boot seals 72, 74 may be shaped like a bellows and flex with the movement of the linear slider bearings 52 in order to keep dirt and other contaminants out of the assembly.

Extending toward the front of the vehicle from each of the slider bearings 52 is a dam support arm 56. A bearing 58 is mounted to the forward end of each of the support arms 56, with a dam support bracket 60 secured to the bearings 58 via a bolt 62 and nut 64. The three dam support brackets 60 are secured to a passively deployable air dam 66 nested along a dam support flange 68 extending from a rear surface 70 of the deployable air dam 66.

The operation of the air dam assembly 13 will now be discussed with reference to FIGS. 1-4. When the vehicle 10 is at rest or just starting from a stop, the springs 54 will push the linear slider bearings 52 up into contact with the upper travel stops 48. Thus, the passively deployable air dam 66 is slid up to a retracted position where a substantial portion of the deployable air dam 66 is recessed behind the fixed air dam 18 (see the solid lines in FIG. 2 for the retracted position).

As the vehicle 10 increases its forward speed, the ram air pressure (see arrows A in FIG. 2) on the exposed portion of a front surface 76 of the deployable air dam 66 will increase. As the vehicle reaches a predetermined activation speed—for example, 56 kilometers per hour—the force created by the air pressure pressing against the front 76 of the deployable air dam 66 will overcome the force of the springs 54, causing the linear slider bearings 52 to slide down on the shank portions 40 (see phantom lines in FIG. 2 for partially deployed position). As the slider bearings 52 slide down, the deployable air dam 66 will slide downward and rearward causing a greater portion of the deployable air dam 66 to be exposed under the fixed air dam 18 (see phantom arrows B in FIG. 2), thus increasing the air pressure acting on the front 76 of the deployable air dam 66. This causes the deployable air dam 66 to move down and rearward further until the linear slider bearings 52 abut the lower travel stops 50, at a fully deployed position. In this fully deployed position, the high speed aerodynamics of the vehicle are improved, thus improving the vehicle's fuel economy.

The spring rates and exposed surface area can be adjusted for different vehicles to provide the desired activation speed. The length of the shank portions 40 can be adjusted for different vehicles to meet the desired retracted and deployed position requirements. Thus, while the deployment is passive, the deployment is still controllable to meet desired aerodynamic and ground clearance requirements for particular vehicles.

With the greater surface area of the deployable air dam 66 exposed in the fully deployed position, the deployable air dam 66 will remain deployed until the vehicle 10 reduces its speed down to a predetermined retraction speed, which is lower than the predetermined activation speed. This difference in speed for deployment and retraction assures that the number of deployment and retraction cycles is minimized. At this retraction speed, the force of the springs 54 will overcome the force from the air pressure, and the linear slider bearings 52 will slide up the shank portions 40 until they abut the upper travel stops 48. With the deployable air dam 66 in its retracted position the ground clearance is increased, so the risk that it will impact a curb and be damaged while parking the vehicle 10 is reduced.

The deployment and retraction of the deployable air dam 66 is accomplished without the need for any on-board power source or actuator, thus reducing the weight, cost and complexity of the air dam assembly 13.

Figure 5:
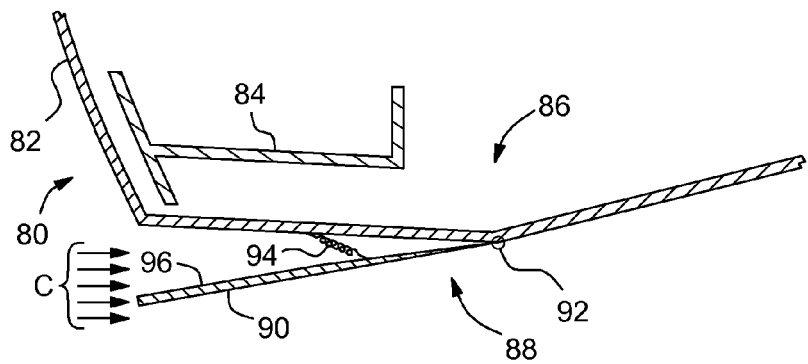
FIG. 5 is a schematic, cross sectional view of an air dam assembly in a retracted position and mounted to vehicle structure according to a second embodiment.
Figure 6:
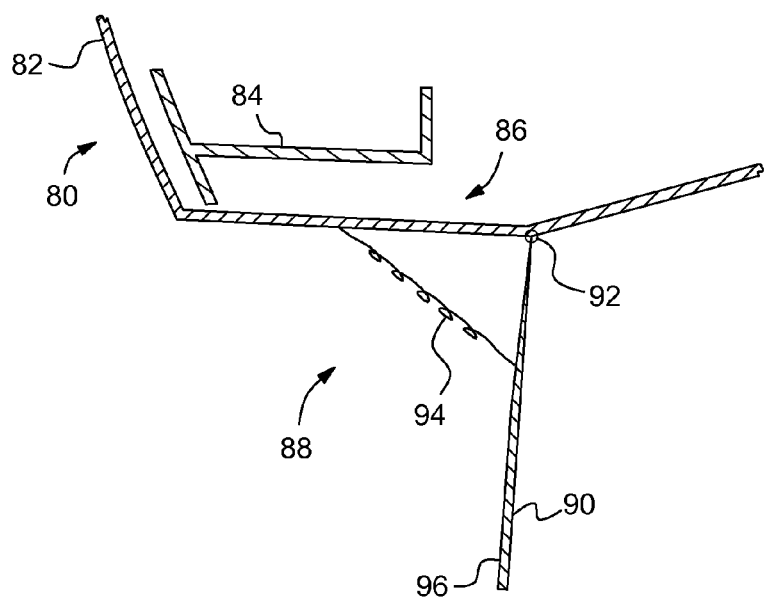
FIG. 6 is a schematic view similar to FIG. 5, but illustrating the passively deployed air dam in a deployed position.
Figure 7:
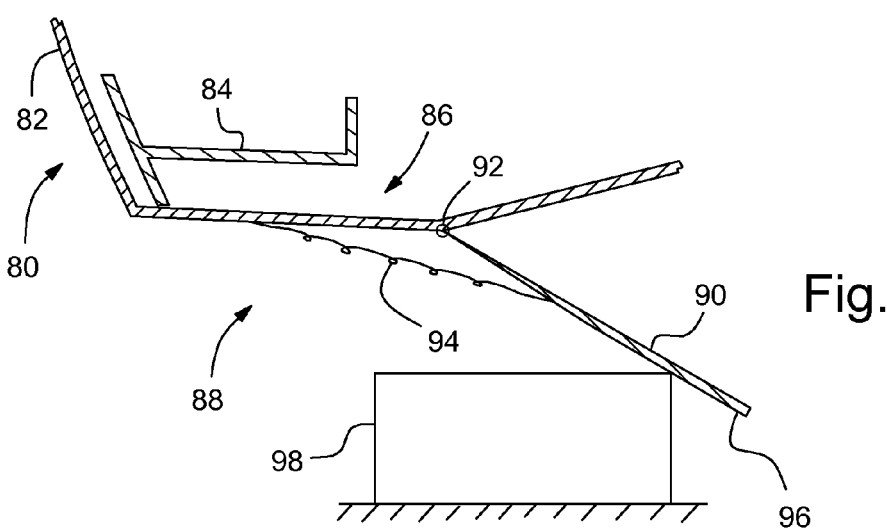
FIG. 7 is a schematic view similar to FIG. 5, but illustrating the passively deployed air dam in an object impact position.

FIGS. 5-7 illustrate a second embodiment. A vehicle front end 80 includes structure, which may be a front fascia 82 and a structural cross car beam 84. Part of the front fascia 82 may form a fixed air dam. The structure supports the air dam assembly 86, which includes a passively deployable air dam assembly 88. The passively deployable air dam assembly 88 includes a passively deployable air dam 90 that is pivotally connected to the vehicle front end 80 via hinge structure 92 and one or more springs 94 that are biased to pull the deployable air dam 90 forward and close to (but not) contacting the structure at the vehicle front end 80 so that a front surface 96 of the deployable air dam 90 is exposed to ram air when the vehicle is moving forward.

The operation of the embodiment of FIGS. 5-7 will now be discussed. When the vehicle is stopped or traveling at relatively low speeds the rearward force, if any, created by the ram air flow (arrows C in FIG. 5) is insufficient to overcome the bias of the one or more springs 94, so the deployable air dam 90 stays pivoted forward in its retracted position (shown in FIG. 5). This assures good ground clearance for the front end of the vehicle while parking.

As the vehicle increases its forward speed, the ram air pressure on the exposed front surface 96 of the deployable air dam 90 increases. When the vehicle reaches the predetermined activation speed, the force created by the air pressure pressing against the front surface 96 will overcome the force of the springs 94, causing the deployable air dam 90 to pivot rearward about the hinge structure 92. The deployable air dam 90 will pivot back until it reaches its deployed position (shown in FIG. 6). This position provides for improve aerodynamic drag, which improves the vehicle fuel economy while traveling at higher speeds. When the vehicle slows down, the ram air pressure is reduced, so the springs 94 will pivot the deployable air dam 90 forward.

With the deployable air dam 90 close to the ground during certain speeds of vehicle travel, the risk of the deployable air dam 90 hitting an obstruction is increased. With this configuration, though, upon the front surface 96 striking an obstruction 98 during vehicle travel, the deployable air dam 90 can continue to pivot backwards to an impact position (shown in FIG. 7) in order to allow the obstruction 98 to pass under the air dam 90.

While certain embodiments of the present invention have been described in detail, those familiar with the art to which this invention relates will recognize various alternative designs and embodiments for practicing the invention as defined by the following claims.

What is claimed is:

1. An air dam assembly mounted under a front end of a vehicle comprising:
    a passively deployable air dam assembly including a passively deployable air dam having a front surface configured to be at least partially exposed to ram air when the vehicle is traveling in a forward direction, and a passive deployment assembly including at least one spring biasing the passively deployable air dam into a retracted position, the passive deployment assembly operatively engaging the passively deployable air dam to allow the passively deployable air dam to move, against the bias of the spring, from the retracted position to a deployed position closer to ground under the vehicle when a forward speed of the vehicle reaches or exceeds a predetermined activation speed, the passive deployment assembly including a support shaft that is fixed and angles upward and forward relative to the vehicle body, a linear slider bearing that is slidably mounted on the support shaft, a dam support arm extending from the linear slider bearing, and a dam support bracket engaging the dam support arm and supporting the passively deployable air dam, the spring engaging the linear slider bearing to bias the slider bearing upward and forward on the support shaft; and
    a fixed air dam that is configured to extend laterally across and be in a fixed position relative to the front end of the vehicle, the fixed air dam being located forward of and at a higher elevation from the ground than the passively deployable air dam.

2. The air dam assembly of claim 1 wherein the passively deployable air dam is located relative to the fixed air dam in the retracted position such that a greater portion of the front surface of the passively deployed air dam is not exposed to the ram air than when the passively deployed air dam is in the deployed position.

3. The air dam assembly of claim 1 wherein the passive deployment assembly includes an upper travel stop that prevents further upward movement of the linear slider bearing when the passively deployable air dam is in the retracted position, a lower travel stop that prevents further downward movement of the linear slider bearing when the passively deployable air dam is in the deployed position, and the spring is a compression spring that mounts between the lower travel stop and the linear slider bearing to bias the linear slider bearing toward the upper travel stop.

4. The air dam assembly of claim 3 wherein the passive deployment assembly includes a flexible upper boot seal sealingly engaged between the upper travel stop and an upper end of the linear slider bearing, and a flexible lower boot seal sealingly engaged between the lower travel stop and a lower end of the linear slider bearing, whereby contaminants are kept away from the surface of the support shaft.

5. An air dam assembly mounted under a front end of a vehicle comprising:
    a fixed air dam that is configured to extend laterally across and be in a fixed position relative to the front end of the vehicle;
    a passively deployable air dam assembly including a passively deployable air dam having a front surface configured to be at least partially exposed to ram air when the vehicle is traveling in a forward direction, the passively deployable air dam being located rearward of and at a lower elevation from the ground than the fixed air dam; the passively deployable air dam assembly further including a support shaft that is fixed and angles upward and forward relative to the vehicle body, a linear slider bearing that is slidably mounted on the support shaft, a spring configured to bias the linear slider bearing upward and forward on the support shaft toward an air dam retracted position, and a dam support extending from the linear slider bearing and supporting the passively deployable air dam;
    whereby, when the vehicle reaches or exceeds a predetermined activation speed, ram air pressure acting against the front surface of the passively deployable air dam will overcome the bias of the spring, causing the passively deployable air dam to move downward and rearward relative to the fixed air dam to a deployed position.

6. The air dam assembly of claim 5 wherein the passively deployable air dam is located relative to the fixed air dam in the retracted position such that a greater portion of the front surface of the passively deployed air dam is not exposed to the ram air than when the passively deployed air dam is in the deployed position.

7. The air dam assembly of claim 5 wherein the passively deployable air dam assembly includes an upper travel stop that prevents further upward movement of the linear slider bearing when the passively deployable air dam is in the retracted position, a lower travel stop that prevents further downward movement of the linear slider bearing when the passively deployable air dam is in the deployed position, and the spring is a compression spring that mounts between the lower travel stop and the linear slider bearing to bias the linear slider bearing toward the upper travel stop.

8. An air dam assembly mounted under a front end of a vehicle comprising:
    a passively deployable air dam assembly including a passively deployable air dam having a front surface configured to be at least partially exposed to ram air when the vehicle is traveling in a forward direction, and a passive deployment assembly including at least one spring biasing the passively deployable air dam into a retracted position, the passive deployment assembly operatively engaging the passively deployable air dam to allow the passively deployable air dam to move, against the bias of the spring, from the retracted position to a deployed position closer to ground under the vehicle when a forward speed of the vehicle reaches or exceeds a predetermined activation speed, the passively deployable air dam assembly including a support shaft that is fixed and angles upward and forward relative to the vehicle body, a linear slider bearing that is slidably mounted on the support shaft, a dam support arm extending from the linear slider bearing, and a dam support bracket engaging the dam support arm and supporting the passively deployable air dam, the spring engaging the linear slider bearing to bias the slider bearing upward and forward on the support shaft.

* * * * *